(12) United States Patent
Yoshizawa

(10) Patent No.: US 8,804,192 B2
(45) Date of Patent: Aug. 12, 2014

(54) IMAGE PROCESSING APPARATUS USING THRESHOLD MATRIX OF RESOLUTION HIGHER THAN RESOLUTION OF INPUT IMAGE

(75) Inventor: Masanori Yoshizawa, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 237 days.

(21) Appl. No.: 13/299,449

(22) Filed: Nov. 18, 2011

(65) Prior Publication Data

US 2012/0162674 A1    Jun. 28, 2012

(30) Foreign Application Priority Data

Dec. 24, 2010    (JP) ................................. 2010-286853

(51) Int. Cl.
*G06F 15/00* (2006.01)
*G06K 1/00* (2006.01)

(52) U.S. Cl.
USPC .......... 358/1.9; 358/3.08; 358/3.07; 345/596; 345/597; 345/598; 345/599

(58) Field of Classification Search
USPC ................................................ 358/1.9, 3.01
See application file for complete search history.

(56) References Cited

U.S. PATENT DOCUMENTS

2004/0227965 A1* 11/2004 Nakajima ...................... 358/1.9
2009/0195835 A1*  8/2009 Kashibuchi et al. ......... 358/3.01

FOREIGN PATENT DOCUMENTS

EP    1185076 A1    6/2002
JP    3726470 B2    10/2005

OTHER PUBLICATIONS

Extended European Search Report for Application No. 11189460.6-1903, dated May 22, 2103.

* cited by examiner

*Primary Examiner* — Mark Zimmerman
*Assistant Examiner* — Michael Burleson
(74) *Attorney, Agent, or Firm* — Cantor Colburn LLP

(57) ABSTRACT

Disclosed is an image processing apparatus which uses a threshold matrix of a resolution higher than a resolution of an input image, the image processing apparatus including: a screen processing section which performs screen processing on an input image which is input; a matrix storage section which stores a threshold matrix of a resolution higher than a resolution of the input image; a threshold obtaining section which obtains a new threshold corresponding to each pixel of the input image based on a threshold of each cell composing the threshold matrix, wherein the screen processing section compares the pixel value of each pixel of the input image with the new threshold corresponding to each pixel of the input image obtained by the threshold obtaining section and generates a multivalue output image.

4 Claims, 8 Drawing Sheets

FIG.4A rnd = 00b

| W0 | W1 |
|----|----|
| W2 | W3 |

FIG.4B rnd = 01b

| W3 | W0 |
|----|----|
| W1 | W2 |

FIG.4C rnd = 10b

| W2 | W3 |
|----|----|
| W0 | W1 |

FIG.4D rnd = 11b

| W1 | W2 |
|----|----|
| W3 | W0 |

IMAGE PROCESSING APPARATUS USING THRESHOLD MATRIX OF RESOLUTION HIGHER THAN RESOLUTION OF INPUT IMAGE

BACKGROUND

1. Field of the Invention

The present invention relates to an image processing apparatus which performs screen processing on an input image.

2. Description of Related Art

Conventionally, when a halftone image is output by an image forming apparatus such as a copier, printer, etc., screen processing using a threshold matrix is performed (see Japanese Patent No. 3726470). Japanese Patent No. 3726470 discloses an image processing apparatus in which after calculating an output pixel value based on a halftone dot pattern with a higher resolution than the resolution of the input and output image signal, a multivalued signal adjusted to an output resolution is obtained.

An example of conventional screen processing using a threshold matrix of a high resolution is described with reference to FIG. 8. In the example here, the resolution of the input image and the output image is 1200 dpi (dot per inch) in both the horizontal scanning direction and the vertical scanning direction, and the resolution of the threshold matrix is 2400 dpi in both the horizontal scanning direction and the vertical scanning direction.

First, gamma correction processing is performed on the input image of 1200 dpi and then the input image after gamma correction processing is converted to the same resolution (2400 dpi) as the threshold matrix. Since in a conversion from 1200 dpi to 2400 dpi the resolution is doubled in both the horizontal scanning direction and the vertical scanning direction, data for four pixels is generated from one pixel. Next, screen processing is performed on each pixel after conversion of resolution using a threshold matrix of 2400 dpi. Then, the result (2400 dpi) output by the screen processing is converted to the resolution according to the resolution (1200 dpi) of the output device.

However, in order to perform screen processing after converting the input image to the resolution which is the same as the threshold matrix, screen arithmetic circuits are necessary for the number of pixels corresponding to the resolution conversion. For example, when the resolution of the image is converted from 1200 dpi to 2400 dpi, 4 screen arithmetic circuits are necessary in order to process in parallel data of 4 pixels. Similarly, when the resolution is converted from 600 dpi to 2400 dpi, 16 screen arithmetic circuits are necessary in order to process in parallel data of 16 pixels. Therefore, when using a method of converting the input image to a resolution with the same resolution as the threshold matrix of a high resolution, the scale of the circuit of the image processing apparatus becomes large. Consequently, computational cost increases and practical use is difficult.

SUMMARY

The present invention has been made in consideration of the above problems, and it is one of main objects to simplify apparatus configuration and to reduce computational cost in an image processing apparatus using a threshold matrix of a resolution higher than the resolution of the input image.

In order to achieve at least one of the above-described objects, according to an aspect of the present invention, there is provided an image processing apparatus which uses a threshold matrix of a resolution higher than a resolution of an input image, the image processing apparatus including:

a screen processing section which performs screen processing on an input image which is input;

a matrix storage section which stores a threshold matrix of a resolution higher than a resolution of the input image;

a threshold obtaining section which obtains a new threshold corresponding to each pixel of the input image based on a threshold of each cell composing the threshold matrix, wherein the screen processing section compares the pixel value of each pixel of the input image with the new threshold corresponding to each pixel of the input image obtained by the threshold obtaining section and generates a multivalue output image.

Preferably, in the image processing apparatus, the resolution of the threshold matrix is P times more in the horizontal scanning direction and Q times more in the vertical scanning direction than the resolution of the input image; and the threshold obtaining section obtains a weighted average of the threshold of each cell of P×Q cells which compose the threshold matrix and obtains a new threshold corresponding to each pixel of the input image.

Preferably, the image processing apparatus further includes:

a weighting coefficient storage section which stores a plurality of combinations of weighting coefficient used in the weighted average; and a selecting section which randomly selects a combination of the weighting coefficient used by the threshold obtaining section from the plurality of combinations of the weighting coefficient.

Preferably, in the image processing apparatus, the output image is output to the image forming apparatus; and the weighting coefficient storage section stores a plurality of combinations of the weighting coefficient for each output color of the image forming apparatus.

BRIEF DESCRIPTION OF THE DRAWINGS

The present invention will become more fully understood from the detailed description given hereinbelow and the appended drawings, and thus are not intended to define the limits of the present invention, and wherein;

FIG. 4A is a diagram showing a combination of a weighting coefficient;

FIG. 4B is a diagram showing a combination of a weighting coefficient;

FIG. 4C is a diagram showing a combination of a weighting coefficient;

FIG. 4D is a diagram showing a combination of a weighting coefficient;

DETAILED DESCRIPTION OF PREFERRED EMBODIMENTS

Below an embodiment of the image processing apparatus of the present invention is described with reference to the drawings. The present embodiment shows an example where a resolution of an input image and an output resolution of an image forming apparatus are 1200 dpi in both a horizontal scanning direction and a vertical scanning direction and a resolution of a threshold matrix is 2400 dpi in both the horizontal scanning direction and the vertical scanning direction.

Figure 1:
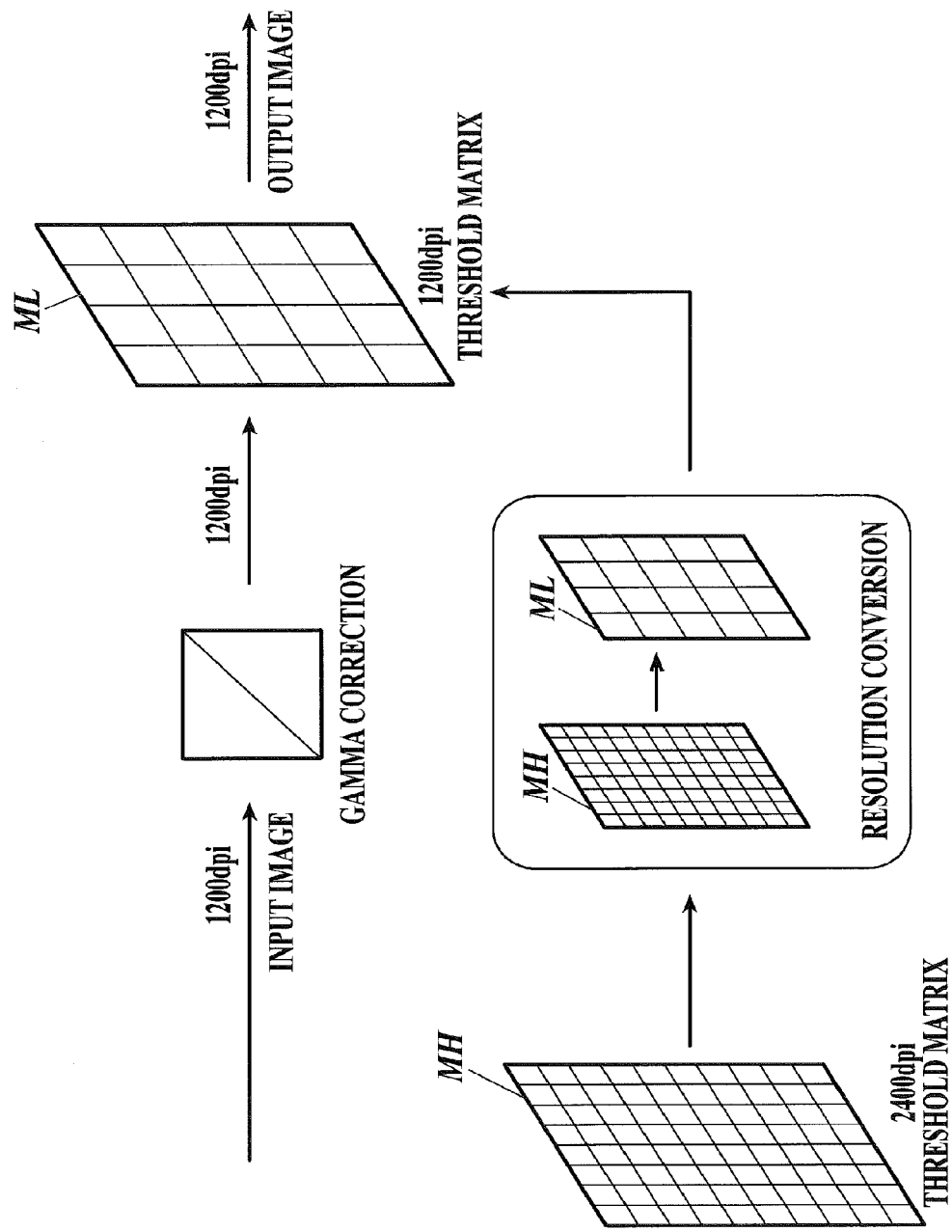
FIG. 1 is a diagram showing an outline of image processing.

FIG. 1 shows an outline of the image processing of the present embodiment.

First, gamma correction processing is performed on the input image of 1200 dpi. Next, a threshold matrix MH (hereinafter referred to as high resolution threshold matrix) of 2400 dpi designed under the condition of high resolution is converted to a resolution of a threshold matrix ML (hereinafter referred to as low resolution threshold matrix) adjusted to the resolution of the input image (1200 dpi) and the newly obtained threshold is used as the threshold for screen processing. Next, screen processing is performed on each pixel of the input image (1200 dpi) after gamma correction processing using the newly obtained threshold and an output image (1200 dpi) is generated.

In the present embodiment, the resolution of the high resolution threshold matrix MH is two times more in the horizontal scanning direction and two times more in the vertical scanning direction than the resolution of the low resolution threshold matrix ML. Therefore, the matrix size of the low resolution threshold matrix ML is to be M pixel×N pixel and the matrix size of the high resolution threshold matrix MH is (2×M pixel)×(2×N pixel).

Figure 2:
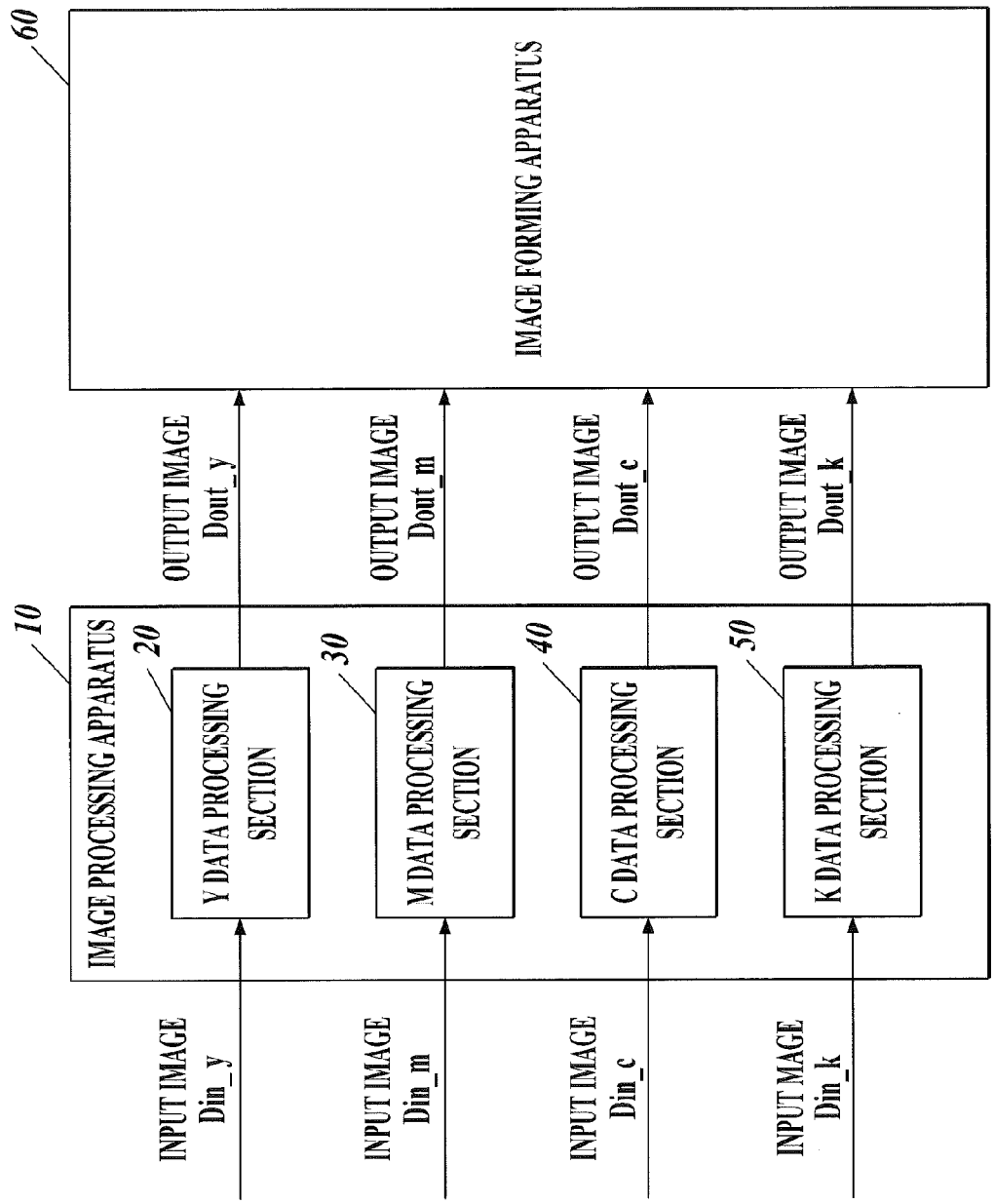
FIG. 2 is a diagram of a configuration of an image processing apparatus.

FIG. 2 shows a configuration of an image processing apparatus 10 of the present embodiment.

The image processing apparatus 10 includes a Y (yellow) data processing section 20, M (magenta) data processing section 30, C (cyan) data processing section 40 and K (black) data processing section 50. The image processing apparatus 10 performs image processing on input images Din_y, Din_m, Din_c, Din_k corresponding to each color of YMCK and outputs output images Dout_y, Dout_m, Dout_c, Dout_k to the image forming apparatus 60.

The image forming apparatus 60 performs image forming on paper with output colors of yellow, magenta, cyan and black based on image data of the output images Dout_y, Dout_m, Dout_c, Dout_k output from the image processing apparatus 10. For example, the image forming apparatus 60 performs image forming of an electrophotographic method and includes a photoreceptor drum, a charging section which charges the photoreceptor drum, an exposing section which scans light exposure on a surface of the photoreceptor drum based on the image data of the output image output from the image processing apparatus 10, a developing section which applies toner on the photoreceptor drum, a transferring section which transfers a toner image formed on the photoreceptor drum on printing paper, a fixing section which fixes the formed toner image on the printing paper, and the like.

Figure 3:
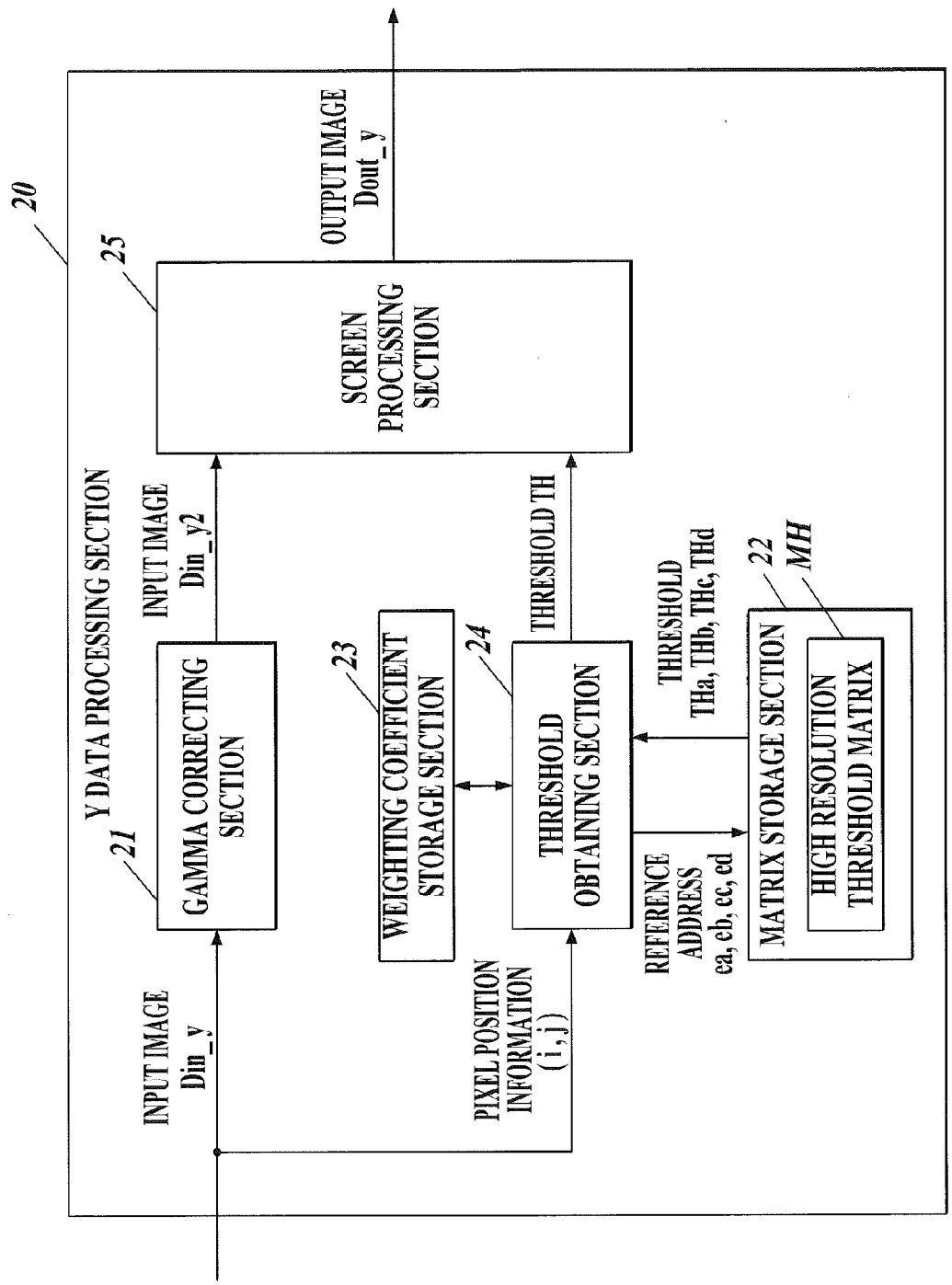
FIG. 3 is a block diagram showing a functional configuration of a Y data processing section.

FIG. 3 shows a functional configuration of the Y data processing section 20.

The Y data processing section 20 includes a gamma correcting section 21, a matrix storage section 22, a weighting coefficient storage section 23, a threshold obtaining section 24, and a screen processing section 25. The processing by the gamma correcting section 21, the threshold obtaining section 24 and the screen processing section 25 can be performed by dedicated hardware or by programming each processing and performing software processing with the program in coordination with the CPU (Central Processing Unit). As a computer readable medium which stores such program, a ROM (Read Only Memory), a nonvolatile memory such as a flash memory, etc. or a portable recording medium such as a CD-ROM, etc. can be applied.

The gamma correcting section 21 performs gamma correction processing on the input image Din_y using a predetermined one dimensional LUT (look up table) and outputs the input image Din_y2.

The matrix storage section 22 is composed of a nonvolatile memory, etc. and stores a high resolution threshold matrix MH with a resolution (2400 dpi) higher than the resolution (1200 dpi) of the input image Din_y2 input in the screen processing section 25 and the output resolution (1200 dpi) of the image forming apparatus 60. The resolution of the high resolution threshold matrix MH is two times more in the horizontal scanning direction (P=2) and two times more in the vertical scanning direction (Q=2) than the resolution of the input image Din_y2. The high resolution threshold matrix MH is stored as a one dimensional array TH [2M×2N] in the matrix storage section 22.

The weighting coefficient storage section 23 is composed of a nonvolatile memory, etc. and stores a plurality of combinations of weighting coefficients used in weighted averaging of yellow. FIG. 4A to FIG. 4D show four types of combinations of weighting coefficients of four pixels in which there are two pixels in the horizontal scanning direction (horizontal direction in FIG. 4A to FIG. 4D) and two pixels in the vertical scanning direction (vertical direction in FIG. 4A to FIG. 4D). In FIG. 4A to FIG. 4D, for example, W0=5, W1=3, W2=3, W3=5 are predetermined.

The threshold obtaining section 24 obtains a new threshold corresponding to each pixel of the input image Din_y based on the threshold of each cell composing the high resolution threshold matrix MH stored in the matrix storage section 22. Specifically, the threshold obtaining section 24 obtains the threshold of each cell of 2 (horizontal scanning direction)×2 (vertical scanning direction)=4 cells which compose the high resolution threshold matrix MH from the matrix storage section 22. Then, the threshold obtaining section 24 randomly selects the combination of the weighting coefficient to be used by the threshold obtaining section 24 from the plurality of combinations of the weighting coefficient stored in the weighting coefficient storage section 23. Based on the selected combination of the weighting coefficient, the threshold obtaining section 24 obtains the weighted average of the four thresholds and this is to be the new threshold corresponding to each pixel of the input image Din_y2. In other words, the threshold obtaining section 24 functions as the threshold obtaining section and the selecting section.

Figure 5:
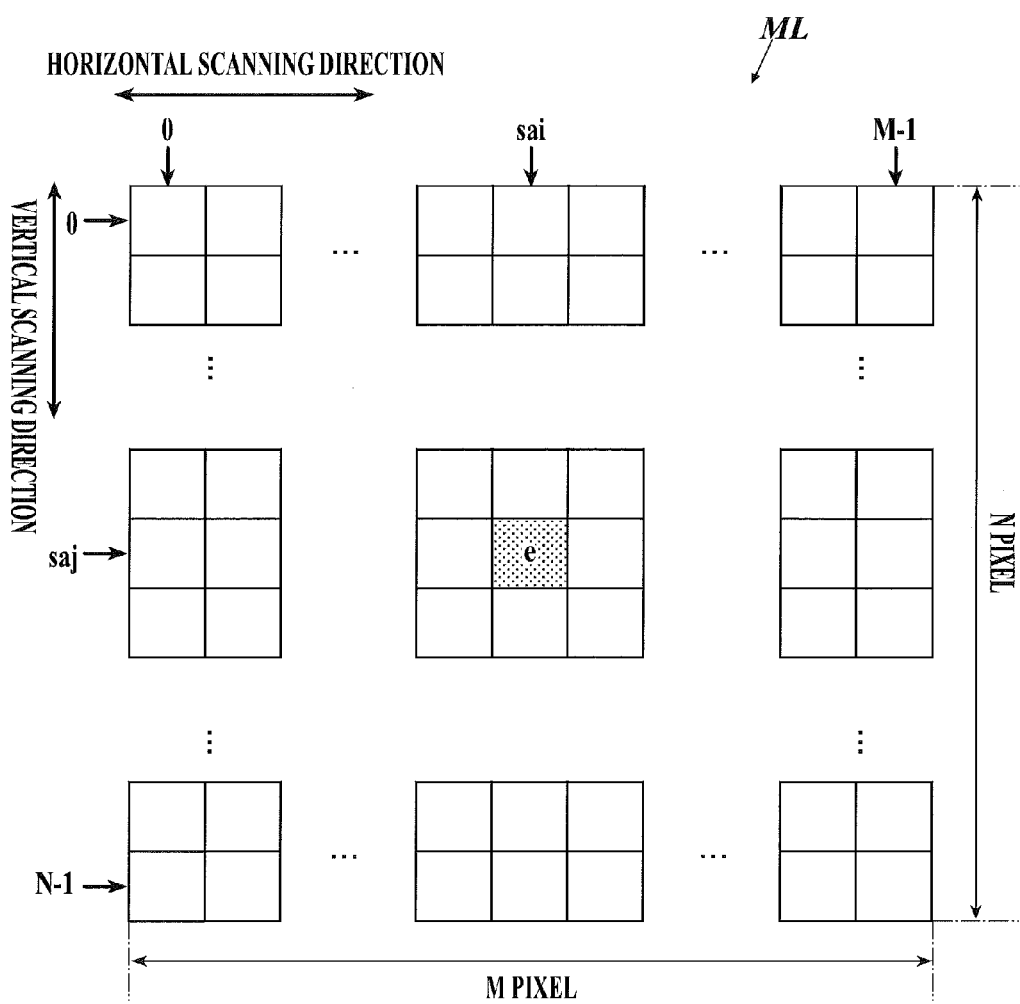
FIG. 5 is a diagram showing an example of a low resolution threshold matrix.
Figure 6:
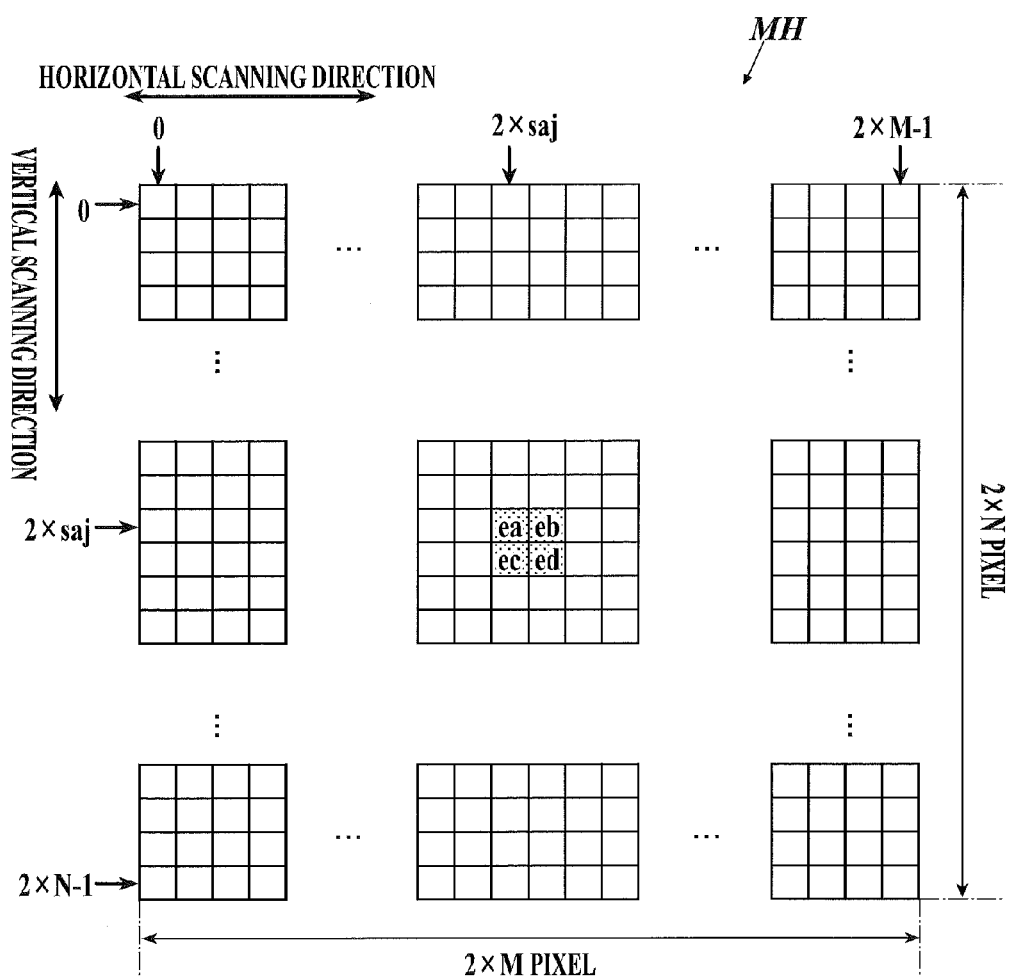
FIG. 6 is a diagram showing an example of a high resolution threshold matrix.

Here, the resolution conversion processing of the threshold matrix in the threshold obtaining section 24 is described in detail. FIG. 5 shows an example of a low resolution threshold matrix ML and FIG. 6 shows an example of a high resolution threshold matrix MH.

The threshold obtaining section 24 uses formulas (1) and (2) to obtain reference position coordinates (sai, saj) in the low resolution threshold matrix ML (in other words, threshold matrix after resolution conversion) corresponding to the target pixel based on the pixel position information (i, j) of the target pixel of the input image Din_y. In the formulas (1) and (2), a % b is the remainder when a is divided by b.

$$sai = i \% M \quad (1)$$

$$saj = j \% N \quad (2)$$

Next, the threshold obtaining section 24 uses the formulas (3) to (6) to obtain the reference address ea, eb, ec, ed (see FIG. 6) of the high resolution threshold matrix MH corresponding to the reference address e (see FIG. 5) of the reference position coordinates (sai, saj) of the low resolution threshold matrix ML.

$$ea = 2 \times sai + (2 \times saj) \times (2 \times M)$$
$$= 2 \times sai + 4 \times saj \times M \quad (3)$$

$$eb = ea + 1 \quad (4)$$

$$ec = ea + 2 \times M \quad (5)$$

$$ed = ea + 2 \times M + 1 \quad (6)$$

Next, based on the reference addresses ea, eb, ec, ed of the high resolution threshold matrix MH obtained by the formulas (3) to (6), the threshold obtaining section 24 uses formulas (7) to (10) to obtain four thresholds THa, THb, THc, THd from the one dimensional array TH [2M×2N] of the high resolution threshold matrix MH.

$$Tha = TH[ea] \quad (7)$$

$$Thb = TH[eb] \quad (8)$$

$$Thc = TH[ec] \quad (9)$$

$$Thd = TH[ed] \quad (10)$$

Next, the threshold obtaining section 24 obtains a random number rnd of 2 bits and based on the obtained random number rnd, the threshold obtaining section 24 selects the combination of the weighting coefficient to be used from the combination of the weighting coefficient stored in the weighting coefficient storage section 23. Specifically, the threshold obtaining section 24 selects the weighting coefficients for four pixels Coefa, Coefb, Coefc, Coefd depending on what the obtained random number rnd (binary) is, which is any one of "00", "01", "10", "11".

For example, when rnd=00, based on the combination of the weighting coefficient shown in FIG. 4A, the threshold obtaining section 24 selects Coefa=W0, Coefb=W1, Coefc=W2, Coefd=W3. When rnd=01, based on the combination of the weighting coefficient shown in FIG. 4B, the threshold obtaining section 24 selects Coefa=W3, Coefb=W0, Coefc=W1, Coefd=W2. When rnd=10, based on the combination of the weighting coefficient shown in FIG. 4C, the threshold obtaining section 24 selects Coefa=W2, Coefb=W3, Coefc=W0, Coefd=W1. When rnd=11, based on the combination of the weighting coefficient shown in FIG. 4D, the threshold obtaining section 24 selects Coefa=W1, Coefb=W2, Coefc=W3, Coefd=W0.

Regarding how the random number rnd is obtained, a random number can be generated by a dedicated hardware or software can be used to generate a random number.

Next, based on the weighting coefficients Coefa, Coefb, Coefc, Coefd, the threshold obtaining section 24 uses the formulas (11) and (12) to obtain the weighted average of the four thresholds THa, THb, THc, Thd and obtains the new threshold TH.

$$TH = (Coefa \times THa + Coefb \times THb + Coefc \times THc + Coefd \times THd)/weight\_div \quad (11)$$

$$weight\_div = Coefa + Coefb + Coefc + Coefd \quad (12)$$

With this, the new threshold TH used in the screen processing is obtained.

When the new threshold TH is obtained, instead of division using the formula (11) (dividing by weight_div), a bit shift can be used. For example, when dividing by 16 (decimal), the value represented by binary number can be shifted by four bits to the right.

The screen processing section 25 performs screen processing on the input image Din_y2 input to the screen processing section 25. Specifically, the screen processing section 25 compares the pixel value of each pixel of the input image Din_y2 with the new threshold TH corresponding to each pixel of the input image Din_y2 obtained by the pixel obtaining section 24 and generates a multiple value output image. In the present embodiment, the screen processing section 25 changes the pixel value to a binary value depending on whether or not the pixel value of each pixel of the input image Din_y2 is the new threshold TH corresponding to the pixel or more.

The functional configuration of the M data processing section 30, the C data processing section 40 and the K data processing section 50 are different regarding only the color of the processing object, and the other configuration is similar to that of the Y data processing section 20 and therefore illustration and description is omitted.

The high resolution threshold matrix and the plurality of combinations of the weighting coefficient used in each of the Y data processing section 20, the M data processing section 30, the C data processing section 40 and the K data processing section 50 can be different for each color of YMCK or can be the same.

For example, for each color of YMCK, the values of W0, W1, W2, W3 shown in FIG. 4A to FIG. 4D can be set individually. The noise can be adjusted for each output color such as for yellow where noise is unnoticeable, W0=7, W1=1, W2=1, W3=7, and for black where noise is noticeable, W0=4, W1=4, W2=4, W3=4, etc.

Figure 7:
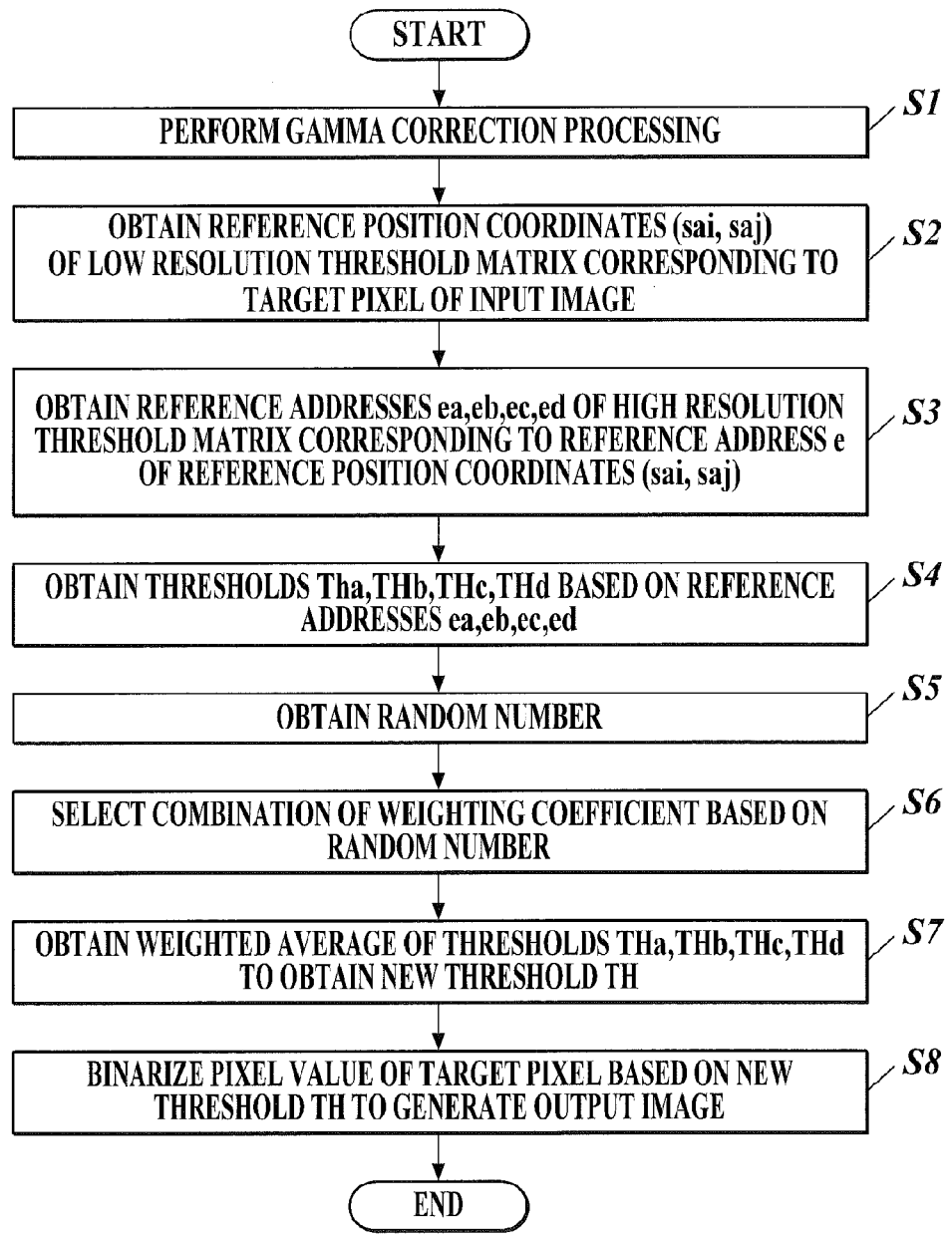
FIG. 7 is a flowchart showing a processing performed by the Y data processing section.
Figure 8:
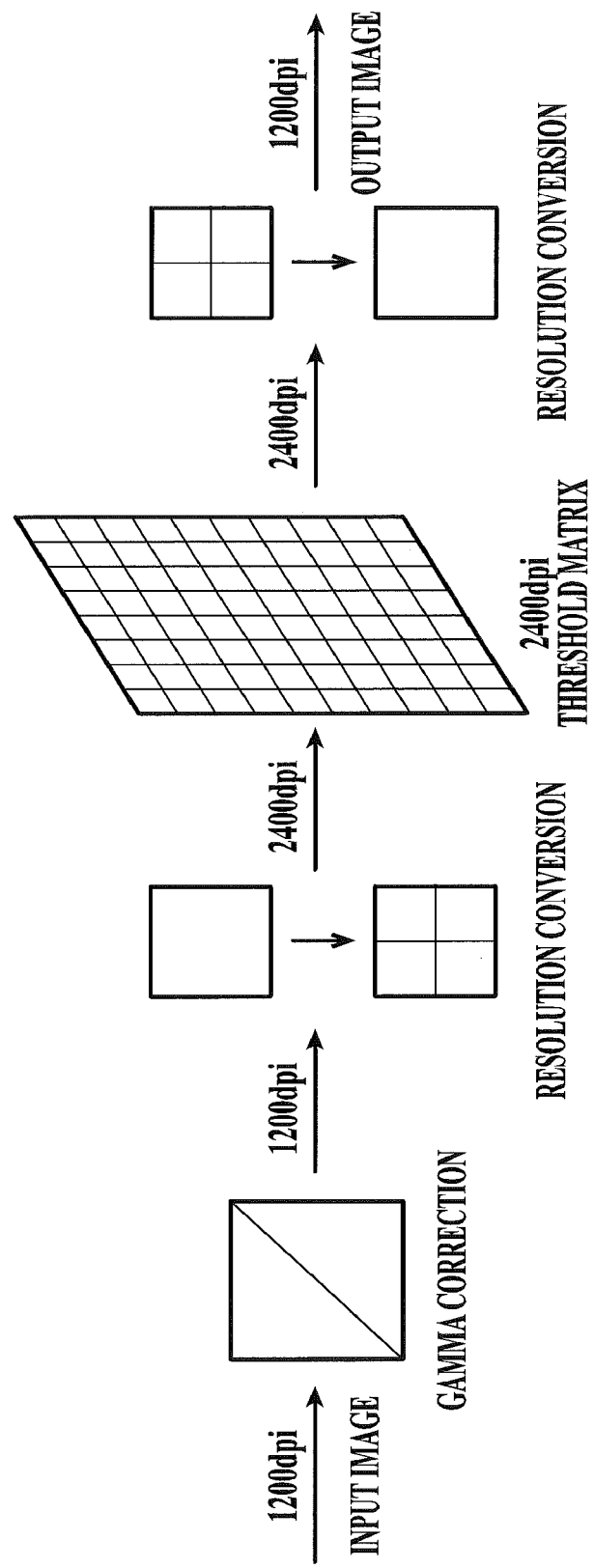
FIG. 8 is a diagram showing an example of conventional screen processing using a threshold matrix of a high resolution.

FIG. 7 is a flowchart showing a processing which is performed by the Y data processing section 20.

The gamma correcting section 21 performs gamma correction processing on the target pixel of the input image Din_y, and generates the input image Din_y2 (step S1).

Next, according to the formulas (1), (2), the threshold obtaining section 24 obtains the reference position coordinates (sai, saj) (see FIG. 5) in the low resolution threshold matrix ML corresponding to the target pixel based on the pixel position information (i, j) of the target pixel of the input image Din_y (step S2).

Next, according to the formulas (3) to (6), the threshold obtaining section 24 obtains the reference addresses ea, eb, ec, ed (see FIG. 6) of the high resolution threshold matrix MH corresponding to the reference address e (see FIG. 5) of the reference position coordinates (sai, saj) of the low resolution threshold matrix ML (step S3).

Next, according to the formulas (7) to (10), the threshold obtaining section 24 obtains four thresholds THa, THb, THc, THd from the one dimensional array TH [2M×2N] of the high resolution threshold matrix MH stored in the matrix storage section 22 based on the reference addresses ea, eb, ec, ed of the high resolution threshold matrix MH (step S4).

Next, the threshold obtaining section 24 obtains the random number rnd (step S5). Then, based on the obtained random number rnd, the threshold obtaining section 24 selects the combination of the weighting coefficient to be used from the combination of the weighting coefficient stored in the weighting coefficient storage section 23 (step S6).

Next, according to the formulas (11), (12), based on the selected combination of the weighting coefficient selected in step S6, the threshold obtaining section 24 obtains the weighted average of the four thresholds THa, THb, THc, THd obtained in step S4 and obtains the new threshold TH (step S7).

Next, based on the new threshold TH, the screen processing section 25 changes the pixel value of the target pixel to a binary value and generates the output image (step S8). Specifically, the screen processing section 25 compares the pixel value of the target pixel of the input image Din_y2 generated in step S1 with the new threshold TH obtained in step S7 and the pixel value is changed to a binary value depending on whether or not the pixel value of the target pixel of the input image Din_y2 is the new threshold TH corresponding to the target pixel or more.

With this, the processing performed by the Y data processing section 20 ends.

The processing performed by the M data processing section 30, the C data processing section 40, and the K data processing section 50 is similar to the above and only the color of the processing object is different.

As described above, conventionally, the resolution of the input image needed to be converted adjusted to the resolution of the threshold matrix and the screen arithmetic circuit was needed for the number of pixels corresponding to the resolution conversion. However, according to the present embodiment, the resolution of the high resolution threshold matrix MH is adjusted to the resolution of the input image Din_y2 input to the screen processing section 25 and then the screen processing can be performed. Therefore, in the image processing apparatus 10 using the threshold matrix of the resolution higher than the resolution of the input image, the apparatus configuration can be simplified and the computational cost can be suppressed.

The degree of freedom of the design of the screen is enhanced and a high quality screen can be easily provided.

When the weighted average of the four thresholds THa, THb, THc, THd of each cell composing the high resolution threshold matrix MH is obtained, the combination of the weighting coefficient is randomly selected. Therefore, generation of periodic noise can be suppressed and tone can be enhanced.

A plurality of candidates of combinations of weighting coefficients used in the weighted average is prepared for each output color (YMCK) of the image forming apparatus 60. Therefore, the weighted average suitable for each color can be obtained, and the noise can be adjusted for each output color of the image forming apparatus 60.

The description of the above embodiment is one example of the image processing apparatus of the present invention and is not limited to the above. The detailed configuration and detailed operation of each section composing the apparatus can be suitably changed without leaving the scope of the present invention.

For example, the present embodiment describes an example where the resolution of the threshold matrix provided in advance is two times more in the horizontal scanning direction and two times more in the vertical scanning direction than the resolution of the input image. However, the ratio of the resolution of the threshold matrix provided in advance and the threshold of the input image is not limited to the above.

The present embodiment describes when the output image Dout_y output by the screen processing section 25 is binary, however, the output image Dout_y output by the screen processing section 25 can be a multivalue of three values or more. In this case, a first threshold and a second threshold (>first threshold) is predetermined for each cell composing the high resolution threshold matrix MH. Similar to the present embodiment, when the resolution of the high resolution threshold matrix MH is P times more in the horizontal scanning direction and Q times more in the vertical scanning direction than the resolution of the input image Din_y2, the weighted average of the first threshold of P×Q cells is obtained and the new threshold TH1 is obtained, and the weighted average of the second threshold of P×Q cells is obtained and the new threshold TH2 is obtained. Then, when the pixel value of the input image Din_y2 is less than the TH1, the screen processing section 25 outputs the first constant value, when the pixel value of the input image Din_y2 is the threshold TH2 or more, the screen processing section 25 outputs the second constant value, and when the pixel value of the input image Din_y2 is the threshold TH1 or more and less than the threshold TH2, the value of linear interpolation of the first constant value and the second constant value can be output. The same can be performed for the other colors.

Not only when screen processing is performed on an image by arranging a rectangular threshold matrix in a tile form, but also when screen processing is performed on an image by positioning the rectangular threshold matrix while shifting in a predetermined shift amount, similarly, the screen processing can be performed after converting the threshold matrix of a high resolution to a resolution same as the input image.

According to an aspect of the preferred embodiments of the present invention, there is provided an image processing apparatus which uses a threshold matrix of a resolution higher than a resolution of an input image, the image processing apparatus including:

a screen processing section which performs screen processing on an input image which is input;
   a matrix storage section which stores a threshold matrix of a resolution higher than a resolution of the input image;
   a threshold obtaining section which obtains a new threshold corresponding to each pixel of the input image based on a threshold of each cell composing the threshold matrix, wherein
   the screen processing section compares the pixel value of each pixel of the input image with the new threshold corresponding to each pixel of the input image obtained by the threshold obtaining section and generates a multivalue output image.

Consequently, in such image processing apparatus which uses a threshold matrix of a resolution higher than a resolution of an input image, an apparatus configuration can be simplified and computational cost can be suppressed.

Preferably, in the image processing apparatus,
   the resolution of the threshold matrix is P times more in the horizontal scanning direction and Q times more in the vertical scanning direction than the resolution of the input image; and
   the threshold obtaining section obtains a weighted average of the threshold of each cell of P×Q cells which compose the threshold matrix and obtains a new threshold corresponding to each pixel of the input image.

Consequently, in such image processing apparatus which uses a threshold matrix of a resolution higher than a resolution of an input image, an apparatus configuration can be simplified and computational cost can be suppressed.

Preferably, the image processing apparatus further includes:

a weighting coefficient storage section which stores a plurality of combinations of weighting coefficient used in the weighted average; and a selecting section which randomly selects a combination of the weighting coefficient used by the threshold obtaining section from the plurality of combinations of the weighting coefficient.

Consequently, a combination of weighting coefficient is selected randomly. Therefore, generation of periodic noise can be suppressed and tone can be enhanced.

Preferably, in the image processing apparatus, the output image is output to the image forming apparatus; and the weighting coefficient storage section stores a plurality of combinations of the weighting coefficient for each output color of the image forming apparatus.

Consequently, with the image processing apparatus, noise can be adjusted for each output color of the image forming apparatus.

The present application is based on Japanese Patent Application No. 2010-286853 filed on Dec. 24, 2010 to the Japanese Patent Office, which shall be a basis for correcting mistranslations.

What is claimed is:

1. An image processing apparatus which uses a threshold matrix of a resolution higher than a resolution of an input image, the image processing apparatus comprising:

a screen processing section which performs screen processing on an input image which is input;

a matrix storage section which stores a threshold matrix of a resolution higher than a resolution of the input image, the threshold matrix being composed of a plurality of cells each of which has a predetermined threshold;

a threshold obtaining section which obtains a new threshold adjusted to the resolution of the input image based on the threshold of each cell composing the threshold matrix, wherein the screen processing section compares a pixel value of each pixel of the input image with the obtained new threshold and generates a multivalue output image.

2. The image processing apparatus of claim 1, wherein the resolution of the threshold matrix is P times more in the horizontal scanning direction and Q times more in the vertical scanning direction than the resolution of the input image; and the threshold obtaining section obtains a weighted average of the threshold of each cell of P×Q cells which compose the threshold matrix and obtains a new threshold corresponding to each pixel of the input image.

3. The image processing apparatus of claim 2, further comprising:

a weighting coefficient storage section which stores a plurality of combinations of weighting coefficient used in the weighted average; and a selecting section which randomly selects a combination of the weighting coefficient used by the threshold obtaining section from the plurality of combinations of the weighting coefficient.

4. The image processing apparatus of claim 3, wherein the output image is output to the image forming apparatus; and the weighting coefficient storage section stores a plurality of combinations of the weighting coefficient for each output color of the image forming apparatus.

* * * * *